United States Patent
Kitagawa et al.

(10) Patent No.: US 9,921,342 B2
(45) Date of Patent: Mar. 20, 2018

(54) POLARIZING PLATE AND OPTICAL LAMINATE

(71) Applicant: NITTO DENKO CORPORATION, Ibaraki-shi, Osaka (JP)

(72) Inventors: Takeharu Kitagawa, Ibaraki (JP); Yuki Kida, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/856,635

(22) Filed: Sep. 17, 2015

(65) Prior Publication Data

US 2016/0084996 A1 Mar. 24, 2016

(30) Foreign Application Priority Data

Sep. 19, 2014 (JP) ................................ 2014-191768

(51) Int. Cl.
*G02B 1/14* (2015.01)
*G02B 5/30* (2006.01)

(52) U.S. Cl.
CPC ............. *G02B 1/14* (2015.01); *G02B 5/3033* (2013.01)

(58) Field of Classification Search
None
See application file for complete search history.

(56) References Cited

U.S. PATENT DOCUMENTS

| 8,314,987 | B2 | 11/2012 | Goto et al. |
| 8,320,042 | B2 | 11/2012 | Goto et al. |
| 8,379,169 | B2 | 2/2013 | Kitagawa et al. |
| 8,411,360 | B2 | 4/2013 | Kitagawa et al. |
| 8,520,169 | B2 | 8/2013 | Kitagawa et al. |
| 8,520,171 | B2 | 8/2013 | Kitagawa et al. |
| 8,709,567 | B2 | 4/2014 | Kitagawa et al. |
| 8,721,816 | B2 | 5/2014 | Kitagawa et al. |

(Continued)

FOREIGN PATENT DOCUMENTS

| JP | 2001-235625 A | 8/2001 |
| JP | 2003-149438 A | 5/2003 |

(Continued)

OTHER PUBLICATIONS

Machine English Translation_JP_2013112693_A; Oikawa, Hiroshige; Curing Type Adhesive Composition; Jun. 10, 2013; JPO; whole document.*

(Continued)

*Primary Examiner* — Tahseen N Khan
(74) *Attorney, Agent, or Firm* — Westerman, Hattori, Daniels & Adrian, LLP (57) ABSTRACT

A polarizing plate of the present invention includes: a first adhesion layer, a transparent protective layer, a second adhesion layer, and a polarizing film in the stated order, wherein: the first adhesion layer has a thickness of 10 μm or more; the transparent protective layer has a thickness of 30 μm or less; the transparent protective layer has a moisture permeability of 200 $g/m^2/24$ hr or less; the second adhesion layer has a bulk water absorption ratio of 10 wt % or less; the polarizing film has a thickness of 10 μm or less; and the polarizing film has a boric acid content of 18 wt % or less with respect to a weight of the polarizing film.

3 Claims, 2 Drawing Sheets

(56) References Cited

U.S. PATENT DOCUMENTS

| | | | |
|---|---|---|---|
| 8,771,454 | B2 | 7/2014 | Goto et al. |
| 8,852,374 | B2 | 10/2014 | Goto et al. |
| 2009/0324944 | A1* | 12/2009 | Toyama ............... C09J 7/0217 428/355 R |
| 2010/0020396 | A1* | 1/2010 | Izumi ............... G02F 1/133528 359/485.01 |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1* | 3/2012 | Kitagawa ............. B29C 55/026 349/96 |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Goto et al. |
| 2013/0100529 | A1* | 4/2013 | Kitagawa ............. B29C 55/026 359/487.01 |
| 2013/0114139 | A1 | 5/2013 | Kitagawa et al. |
| 2013/0128357 | A1* | 5/2013 | Izaki ............. B29C 55/026 359/487.02 |
| 2014/0186568 | A1 | 7/2014 | Kitagawa et al. |
| 2016/0084996 | A1 | 3/2016 | Kitagawa et al. |

FOREIGN PATENT DOCUMENTS

| | | | |
|---|---|---|---|
| JP | 2004-010674 | A | 1/2004 |
| JP | 2005-173440 | A | 6/2005 |
| JP | 2010039458 | A | 2/2010 |
| JP | 4751481 | B2 | 5/2011 |
| JP | 2012-047799 | A | 3/2012 |
| JP | 2012-073580 | A | 4/2012 |
| JP | 2013-011837 | A | 1/2013 |
| JP | 2013-112693 | A | 6/2013 |
| JP | 2013112693 | * | 6/2013 |
| JP | 2013-148806 | A | 8/2013 |
| JP | 5332599 | B2 | 8/2013 |
| JP | 2014-006505 | A | 1/2014 |
| JP | 2014-012819 | A | 1/2014 |
| JP | 6871408 | B1 | 3/2016 |
| WO | 2015030203 | A1 | 3/2015 |

OTHER PUBLICATIONS

The Explanation of Circumstances Concerning Accelerated Examination dated Dec. 25, 2014, issued in counterpart Japanese Patent Application No. 2014-191768, with English translation (8 pages).
Notification of Reasons for Refusal dated Feb. 25, 2015, issued in counterpart Japanese Patent Application No. 2014-191768, with English translation (10 pages).
International Search Report dated May 10, 2016 issued in counterpart international application No. PCT/ JP2016/053108 (3 pages).

* cited by examiner

POLARIZING PLATE AND OPTICAL LAMINATE

This application claims priority under 35 U.S.C. Section 119 to Japanese Patent Application No. 2014-191768 filed on Sep. 19, 2014, which are herein incorporated by references.

BACKGROUND OF THE INVENTION

1. Field of the Invention

The present invention relates to a polarizing plate and an optical laminate.

2. Description of the Related Art

A polarizing plate is arranged on each of both sides of the liquid crystal cell of a liquid crystal display apparatus as a typical image display apparatus. The arrangement results from the image-forming system of the apparatus. The polarizing plate typically includes a polarizing film and a protective film for protecting the polarizing film (for example, Japanese Patent No. 4751481 and Japanese Patent Application Laid-open No. 2003-149438). In association with a tendency toward the thinning of an image display apparatus in recent years, there has also been a growing requirement for the thinning of the polarizing plate to be used in the image display apparatus, and hence the thinning of each of the polarizing film and the protective film has been advancing. A technology involving using only one protective film for protecting the polarizing film has been proposed in relation to the thinning of the polarizing plate (for example, Japanese Patent No. 5332599). However, when the polarizing plate of Japanese Patent No. 5332599 is bonded to a display panel, a distance between the display panel and the polarizing film is large, and hence a problem occurs in that the display panel is liable to warp.

A cause for such warping of the display panel as described above is, for example, the deformation of the polarizing film (such as its expansion or contraction due to a temperature change). A reduction in concentration of boric acid in the polarizing film is conceivable as one means for reducing the deformation of the polarizing film. However, when the boric acid concentration is reduced, the following problem remarkably occurs. The durability of the polarizing film reduces, and in particular, when the polarizing film is thin, the polarizing film cannot be used under high temperature and high humidity.

SUMMARY OF THE INVENTION

The present invention has been made to solve the related-art problems, and a primary object of the present invention is to provide a thin polarizing plate that can suppress the warping of an adherend such as a display panel upon its bonding to the adherend, and is excellent in durability under high temperature and high humidity.

A polarizing plate of the present invention includes: a first adhesion layer, a transparent protective layer, a second adhesion layer, and a polarizing film in the stated order, wherein: the first adhesion layer has a thickness of 10 µm or more; the transparent protective layer has a thickness of 30 µm or less; the transparent protective layer has a moisture permeability of 200 g/m$^2$/24 hr or less; the second adhesion layer has a bulk water absorption ratio of 10 wt % or less; the polarizing film has a thickness of 10 µm or less; and the polarizing film has a boric acid content of 18 wt % or less with respect to a weight of the polarizing film.

According to another aspect of the present invention, there is provided an optical laminate. The optical laminate includes the polarizing plate, a third adhesion layer, and an optical film in the stated order, wherein the third adhesion layer is provided on a side of the polarizing film of the polarizing plate opposite to the second adhesion layer.

In one embodiment of the present invention, the optical laminate is a brightness enhancement film According to the one embodiment of the present invention, the polarizing film having a low boric acid concentration is used, the transparent protective layer having a low moisture permeability is used as a protective layer for protecting the polarizing film, and the polarizing film and the protective layer are laminated through the adhesion layer having a low water absorption ratio (second adhesion layer), and hence the thin polarizing plate that can suppress the warping of an adherend such as a display panel upon its bonding to the adherend and is excellent in durability can be obtained.

DETAILED DESCRIPTION OF THE PREFERRED EMBODIMENTS

A. Entire Construction of Polarizing Plate

Figure 1:
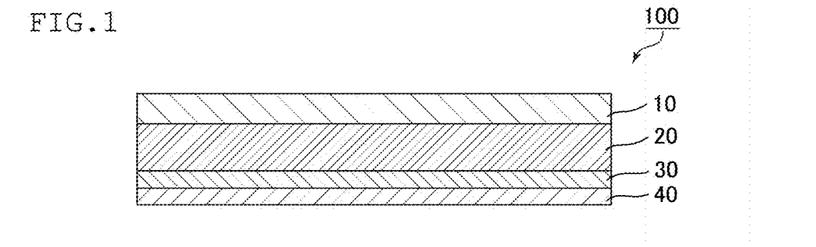
FIG. 1 is a schematic sectional view of a polarizing plate according to one embodiment of the present invention.

FIG. 1 is a schematic sectional view of a polarizing plate according to one embodiment of the present invention. A polarizing plate 100 of FIG. 1 includes a first adhesion layer 10, a transparent protective layer 20, a second adhesion layer 30, and a polarizing film 40 in the stated order. The first adhesion layer 10 can function as an adhesion layer in bonding of the polarizing plate 100 to any other member (such as an ITO substrate or a liquid crystal cell). The transparent protective layer 20 has a function of protecting the polarizing film 40. The transparent protective layer is preferably arranged only on one side of the polarizing film.

In the present invention, the transparent protective layer 20 is arranged between the first adhesion layer 10 and the polarizing film 30. Accordingly, a component in the first adhesion layer is prevented from moving to the polarizing film and hence the deterioration of the polarizing film (such as a reduction in its transmittance) is prevented. In addition, a component in the polarizing film (such as iodine or potassium) is prevented from moving to the other member as an adherend and hence the contamination or deterioration of the adherend is prevented.

On the other hand, in a polarizing plate including a protective layer only on one side of a polarizing film, the polarizing film is liable to deform and warp under high temperature. When a force produced by the deformation of the polarizing film is constant, the warping of an adherend such as a display panel upon bonding of the polarizing plate to the adherend enlarges as a distance between the polarizing film and the adherend becomes longer. Specifically, in the one side-protected polarizing plate in which the protective layer is arranged between the polarizing film and the adherend, the adherend is liable to warp owing to the force produced by the deformation of the polarizing film. In the present invention, as described later, the warping can be reduced by setting the boric acid content of the polarizing film to 18 wt % or less to suppress the force produced by the deformation of the polarizing film. In such polarizing plate of the present invention, an inconvenience due to the occurrence of the warping of the display panel as the adherend (such as a display failure) can be prevented.

In addition, in the polarizing plate of the present invention, the moisture permeability of the transparent protective layer is 200 g/m$^2$/24 hr or less and the bulk water absorption ratio of the second adhesion layer is 10 wt % or less. When such transparent protective layer and second adhesion layer are used to form a laminated structure formed of the transparent protective layer, the second adhesion layer, and the polarizing film, the penetration of moisture from the transparent protective layer side into the polarizing film is suppressed and hence the deterioration of the polarizing film can be prevented. Accordingly, the polarizing plate of the present invention is excellent in durability even when the polarizing plate uses a polarizing film having a low boric acid content as described above. It should be noted that a preventing effect on the deterioration of the polarizing film is made more significant by laminating an optical film on the surface of the polarizing film on a side opposite to the second adhesion layer. Details about an optical laminate including the polarizing plate and the optical film are described later.

B. Polarizing Film

The thickness of the polarizing film is preferably 10 μm or less, more preferably 8 μm or less, still more preferably 6 μm or less. The use of such thin polarizing film can provide a thin polarizing plate. In addition, thinning the polarizing film can reduce the expansion-contraction force of the polarizing film produced by a change in its surrounding environment. When the polarizing film is relatively thick, the expansion-contraction force produced in the polarizing film enlarges, and hence a thick protective layer needs to be bonded for suppressing the expansion and contraction of the polarizing film. On the other hand, when the polarizing film is thinned to reduce the expansion-contraction force produced in the polarizing film like the present invention, the transparent protective layer can be thinned and hence the entirety of the polarizing plate can be thinned. Further, as the polarizing film becomes thinner and hence the expansion-contraction force produced in the polarizing film becomes smaller, a stress produced between the polarizing plate and a member bonded thereto (such as a brightness enhancement film, a retardation film, or a liquid crystal cell) becomes smaller, and hence optical strain produced in the member is suppressed. In the present invention, the polarizing film can be thinned without the impairment of its durability. A lower limit for the thickness of the polarizing film is preferably 1 μm or more, more preferably 2 μm or more.

The boric acid content of the polarizing film is 18 wt % or less, preferably 17.5 wt % or less, more preferably 17 wt % or less with respect to the weight of the polarizing film. When the content falls within such range, such polarizing film that a force produced by its deformation (expansion or contraction) due to a change in environmental temperature is suppressed can be obtained. The use of a polarizing plate including such polarizing film can prevent the warping of an adherend (such as a display panel). A lower limit for the boric acid content of the polarizing film is preferably 12 wt % or more with respect to the weight of the polarizing film. When the boric acid content of the polarizing film is less than 12 wt %, the durability of the polarizing film may reduce. The boric acid content of the polarizing film can be adjusted depending on, for example, the boric acid concentration of an aqueous solution of boric acid to be used in boric acid treatment (such as insolubilizing treatment or cross-linking treatment) at the time of the production of the polarizing film and the boric acid concentration of a stretching bath (aqueous solution of boric acid) in the case where the polarizing film is produced through underwater stretching (described later). A method of measuring the boric acid content is described later.

The polarizing film preferably exhibits absorption dichroism at any wavelength in the wavelength range of from 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

The polarizing film is preferably an iodine-based polarizing film. More specifically, the polarizing film may be formed of an iodine-containing polyvinyl alcohol-based resin (hereinafter sometimes referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. It should be noted that the average polymerization degree may be determined in conformity with JIS K 6726-1994.

A method of producing the polarizing film is, for example, a method (I) including stretching and dyeing a PVA-based resin film alone, or a method (II) including stretching and dyeing a laminate (i) having a resin base material and a polyvinyl alcohol-based resin layer. Detailed description of the method (I) is omitted because the method is known and conventionally used in the art. The production method (II) preferably includes the step of stretching and dyeing the laminate (i) having the resin base material and the polyvinyl alcohol-based resin layer formed on at least one side of the resin base material to produce a polarizing film on the resin base material. The laminate (i) may be formed by applying an application liquid containing a polyvinyl alcohol-based resin onto the resin base material and drying the applied liquid. In addition, the laminate (i) may be formed by transferring a polyvinyl alcohol-based resin film onto the resin base material. For example, Japanese Patent Application Laid-open No. 2012-73580 describes details about the production method (II), and is incorporated herein by reference.

C. Transparent Protective Layer

Any appropriate resin film may be adopted as the transparent protective layer. As a material for forming the transparent protective layer, there are given, for example: a cycloolefin-based resin such as a norbornene-based resin; an olefin-based resin such as polyethylene or polypropylene; a polyester-based resin; and a (meth)acrylic resin. It should be noted that the term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, Japanese Patent Application Laid-open No. 2006-309033, Japanese Patent Application Laid-open No. 2006-317560, Japanese Patent Application Laid-open No. 2006-328329, Japanese Patent Application Laid-open No. 2006-328334, Japanese Patent Application Laid-open No. 2006-337491, Japanese Patent Application Laid-open No. 2006-337492, Japanese Patent Application Laid-open No. 2006-337493, Japanese Patent Application Laid-open No. 2006-337569, Japanese Patent Application Laid-open No. 2007-009182, Japanese Patent Application Laid-open No. 2009-161744, and Japanese Patent Application Laid-open No. 2010-284840. The descriptions thereof are incorporated herein by reference.

The resin film is formed by any appropriate method. Examples of the film-forming method include a melt extrusion method, a solution casting method, a calendar method, and a compression forming method. Of those, a melt extrusion method is preferred. In addition, the resin film may be subjected to stretching treatment.

The monolayer thickness of the transparent protective layer is preferably 30 μm or less, more preferably from 10 μm to 30 μm, still more preferably from 10 μm to 25 μm.

The moisture permeability of the transparent protective layer is preferably 200 g/m$^2$/24 hr or less, more preferably 170 g/m$^2$/24 hr or less, still more preferably 130 g/m$^2$/24 hr or less. When the moisture permeability falls within such range, the deterioration of the polarizing film due to moisture can be prevented, and hence a polarizing plate excellent in durability under high temperature and high humidity can be obtained. It should be noted that the "moisture permeability" is a value determined by measuring the amount (g) of water vapor that passes a sample having an area of 1 m$^2$ within 24 hours in an atmosphere having a temperature of 40° C. and a humidity of 92% RH in conformity with the moisture permeability test (cup method) of JIS Z 0208.

D. First Adhesion Layer

The first adhesion layer can be formed by: applying a material for forming the first adhesion layer onto the transparent protective layer; and drying, heating, or curing the material as required. A material for forming the first adhesion layer is, for example, a pressure-sensitive adhesive, an adhesive, or an anchor coat agent. The adhesion layer may be of such a multilayer structure that an anchor coat layer is formed on the surface of an adherend and the adhesion layer is formed thereon.

Examples of the material for forming the first adhesion layer include a material whose base polymer is a polymer such as an acrylic polymer, a silicone-based polymer, polyester, polyurethane, polyamide, polyether, a fluorine-based polymer, a rubber-based polymer, an isocyanate-based polymer, a polyvinyl alcohol-based polymer, a gelatin-based polymer, a vinyl-based polymer, a latex-based polymer, or aqueous polyester.

The thickness of the first adhesion layer is preferably 10 μm or more, more preferably from 10 μm to 30 μm, still more preferably from 10 μm to 25 μm. When the thickness falls within such range, a polarizing plate excellent in adhesion property can be obtained. In ordinary cases, the presence of a thick adhesion layer may be a cause for the warping of the polarizing plate. In the present invention, however, even when the thickness of the adhesion layer is increased, a polarizing plate sufficiently suppressed in warping can be obtained.

E. Second Adhesion Layer

The bulk water absorption ratio of the second adhesion layer is 10 wt % or less, preferably 8 wt % or less, more preferably 5 wt % or less, still more preferably from 0.05 wt % to 2 wt %. When the bulk water absorption ratio is 10 wt % or less, a polarizing plate excellent in durability under high temperature and high humidity can be obtained. More specifically, the penetration of water into the polarizing film when the film is arranged under a high-temperature and high-humidity environment is suppressed, and hence a change in transmittance of the polarizing film and a reduction in polarization degree thereof can be suppressed. On the other hand, when the bulk water absorption ratio is set to 0.05 wt % or more, an adhesion layer that can appropriately absorb moisture contained in the polarizing film when brought into contact with the polarizing film can be formed, and thus an external appearance failure (such as cissing or air bubbles) in the polarizing plate to be obtained can be suppressed. It should be noted that the bulk water absorption ratio is measured in conformity with the testing method for a water absorption ratio described in JIS K 7209. Specifically, the bulk water absorption ratio is a water absorption ratio in the case where the second adhesion layer after curing is immersed in pure water at 23° C. for 24 hours, and is determined by the following equation: bulk water absorption ratio (%)=[{(weight of adhesion layer after immersion)−(weight of adhesion layer before immersion)}/(weight of adhesion layer before immersion)]×100.

The thickness of the second adhesion layer is preferably from 0.1 μm to 3 lam, more preferably from 0.3 μm to 2 μm, still more preferably from 0.5 μm to 1.5 μm, particularly preferably from 0.7 μm to 1.5 μm. When the thickness falls within such range, the second adhesion layer excellent in adhesion property can be formed, and hence a polarizing plate excellent in external appearance and durability can be obtained.

The second adhesion layer has a glass transition temperature Tg of preferably 60° C. or more, more preferably 70° C. or more, still more preferably 75° C. or more, particularly preferably 100° C. or more, most preferably 120° C. or more. In addition, an upper limit for the glass transition temperature Tg of the second adhesion layer is preferably 300° C. or less, more preferably 240° C. or less, still more preferably 180° C. or less. When the glass transition temperature Tg falls within such range, a polarizing plate excellent in flexibility and excellent in durability can be obtained. The glass transition temperature is determined from the peak top temperature of tan δ obtained through dynamic viscoelasticity measurement. For example, the glass transition temperature may be measured using a dynamic viscoelasticity measuring apparatus available under the trade name "RSAIII" from TA Instruments under the following measurement conditions.
Sample size: 10 mm in width and 30 mm in length,
Clamp distance: 20 mm,
Measurement mode: tensile, Frequency: 1 Hz, Rate of temperature increase: 5° C./min The second adhesion layer has a storage modulus in the region of 70° C. or less of preferably $1.0 \times 10^6$ Pa or more, more preferably $1.0 \times 10^7$ Pa or more, still more preferably from $1.0 \times 10^7$ Pa to $1.0 \times 10^{10}$ Pa. When the storage modulus falls within such range, a crack in the polarizing plate occurring upon application of a heat cycle (for example, from −40° C. to 80° C.) can be suppressed. The storage modulus may be measured by the dynamic viscoelasticity measurement.

The second adhesion layer may be formed by curing a curable adhesive. Examples of the curable adhesive include a radical polymerization-curable adhesive and a cationic polymerization-curable adhesive. The curable adhesive contains a curable compound as a main component. The bulk water absorption ratio of the second adhesion layer may be adjusted by, for example, the kind of the curable compound.

(Radical Polymerization-Curable Adhesive)

The radical polymerization-curable adhesive contains a radically polymerizable compound as the curable compound. The radically polymerizable compound may be a compound capable of being cured with an active energy ray, or may be a compound capable of being cured with heat. Examples of the active energy ray include an electron beam, UV light, and visible light.

As the radically polymerizable compound, for example, there may be used a compound having a radically polymerizable functional group having a carbon-carbon double bond, such as a (meth)acryloyl group or a vinyl group. A polyfunctional radically polymerizable compound is preferably used as the radically polymerizable compound. The radically polymerizable compounds may be used alone or in combination. In addition, the polyfunctional radically polymerizable compound and a monofunctional radically polymerizable compound may be used in combination.

A compound having a high log P value (octanol/water partition coefficient) (preferably 2 or more, more preferably 3 or more, still more preferably 4 or more) is preferably used as the curable compound. In addition, a compound having a high log P value is preferably selected as the radically polymerizable compound as well. The log P value of the radically polymerizable compound is preferably 2 or more, more preferably 3 or more, still more preferably 4 or more. When the log P value falls within such range, the polarizing film can be prevented from being deteriorated by moisture, and thus a polarizing plate excellent in durability under high temperature and high humidity can be obtained. The log P value may be measured in conformity with the shake flask method described in JIS Z 7260. In addition, the log P value may also be determined through calculation using, for example, ChemDraw Ultra manufactured by CambridgeSoft.

Examples of the polyfunctional radically polymerizable compound include: esterified products of a (meth)acrylate and a polyhydric alcohol, such as tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A-ethylene oxide adduct di(meth)acrylate, bisphenol A-propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropane formal (meth)acrylate, dioxane glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and EO-modified diglycerin tetra(meth)acrylate; 9,9-bis[4-(2-(meth)acryloyloxyethoxy)phenyl]fluorene; epoxy(meth)acrylate; urethane(meth)acrylate; and polyester(meth)acrylate.

A compound having a high log P value is preferably used as the polyfunctional radically polymerizable compound. Examples of such compound include: an alicyclic(meth)acrylate such as tricyclodecanedimethanol di(meth)acrylate (log P=3.05) or isobornyl(meth)acrylate (log P=3.27); a long-chain aliphatic(meth)acrylate such as 1,9-nonanediol di(meth)acrylate (log P=3.68) or 1,10-decanediol diacrylate (log P=4.10); a multibranched (meth)acrylate such as neopentyl glycol hydroxypivalate-(meth)acrylic acid adduct (log P=3.35) or 2-ethyl-2-butylpropanediol di(meth)acrylate (log P=3.92); and an aromatic ring-containing (meth)acrylate such as bisphenol A di(meth)acrylate (log P=5.46), bisphenol A-ethylene oxide (4 mol) adduct di(meth)acrylate (log P=5.15), bisphenol A-propylene oxide (2 mol) adduct di(meth)acrylate (log P=6.10), bisphenol A-propylene oxide (4 mol) adduct di(meth)acrylate (log P=6.43), 9,9-bis[4-(2-(meth)acryloyloxyethoxy)phenyl]fluorene (log P=7.48), or p-phenylphenol(meth)acrylate (log P=3.98).

When the polyfunctional radically polymerizable compound and the monofunctional radically polymerizable compound are used in combination, the content of the polyfunctional radically polymerizable compound is preferably from 20 wt % to 97 wt %, more preferably from 50 wt % to 95 wt %, still more preferably from 75 wt % to 92 wt %, particularly preferably from 80 wt % to 92 wt % with respect to the total amount of the radically polymerizable compounds. When the content falls within such range, a polarizing plate excellent in durability under high temperature and high humidity can be obtained.

An example of the monofunctional radically polymerizable compound is a (meth)acrylamide derivative having a (meth)acrylamide group. When the (meth)acrylamide derivative is used, an adhesion layer excellent in adhesion property can be formed with high productivity. Specific examples of the (meth)acrylamide derivative include: an N-alkyl group-containing (meth)acrylamide derivative such as N-methyl(meth)acrylamide, N,N-dimethyl(meth)acrylamide, N,N-diethyl(meth)acrylamide, N-isopropyl(meth)acrylamide, N-butyl(meth)acrylamide, or N-hexyl(meth)acrylamide; an N-hydroxyalkyl group-containing (meth)acrylamide derivative such as N-methylol(meth)acrylamide, N-hydroxyethyl(meth)acrylamide, or N-methylol-N-propane(meth)acrylamide; an N-aminoalkyl group-containing (meth)acrylamide derivative such as aminomethyl(meth)acrylamide or aminoethyl(meth)acrylamide; an N-alkoxy group-containing (meth)acrylamide derivative such as N-methoxymethylacrylamide or N-ethoxymethylacrylamide; and an N-mercaptoalkyl group-containing (meth)acrylamide derivative such as mercaptomethyl(meth)acrylamide or mercaptoethyl(meth)acrylamide. In addition, as a heterocycle-containing (meth)acrylamide derivative in which the nitrogen atom of its (meth)acrylamide group forms a heterocycle, for example, there may be used N-acryloylmorpholine, N-acryloylpiperidine, N-methacryloylpiperidine, or N-acryloylpyrrolidine. Of those, an N-hydroxyalkyl group-containing (meth)acrylamide derivative is preferred, and N-hydroxyethyl(meth)acrylamide is more preferred.

In addition, as the monofunctional radically polymerizable compound, for example, there may be used a (meth) acrylic acid derivative having a (meth)acryloyloxy group; a carboxy group-containing monomer such as (meth)acrylic acid, carboxyethyl acrylate, carboxypentyl acrylate, itaconic acid, maleic acid, fumaric acid, crotonic acid, or isocrotonic acid; a lactam-based vinyl monomer such as N-vinylpyrrolidone, N-vinyl-ε-caprolactam, or methylvinylpyrrolidone; and a vinyl-based monomer having a nitrogen-containing heterocycle such as vinylpyridine, vinylpiperidone, vinylpyrimidine, vinylpiperazine, vinylpyrazine, vinylpyrrole, vinylimidazole, vinyloxazole, or vinylmorpholine.

When the polyfunctional radically polymerizable compound and the monofunctional radically polymerizable compound are used in combination, the content of the monofunctional radically polymerizable compound is preferably from 3 wt % to 80 wt %, more preferably from 5 wt % to 50 wt %, still more preferably from 8 wt % to 25 wt %, particularly preferably from 8 wt % to 20 wt % with respect to the total amount of the radically polymerizable compounds. When the content falls within such range, a polarizing plate excellent in durability under high temperature and high humidity can be obtained.

The radical polymerization-curable adhesive may further contain any other additive. When the radical polymerization-curable adhesive contains a curable compound capable of being cured with an active energy ray, the adhesive may further contain, for example, a photopolymerization initiator, a photoacid generator, or a silane coupling agent. In addition, when the radical polymerization-curable adhesive contains a curable compound capable of being cured with heat, the adhesive may further contain, for example, a thermal polymerization initiator or a silane coupling agent. In addition, examples of the other additive include a polymerization inhibitor, a polymerization initiation aid, a leveling agent, a wettability improver, a surfactant, a plasticizer, a UV absorber, an inorganic filler, a pigment, and a dye.

(Cationic Polymerization-Curable Adhesive)

The cationic polymerization-curable adhesive contains a cationically polymerizable compound as the curable compound. An example of the cationically polymerizable compound is a compound having an epoxy group and/or an oxetanyl group. A compound having at least two epoxy groups in the molecule is preferably used as the compound having an epoxy group. Examples of the compound having an epoxy group include: a compound having at least two epoxy groups and at least one aromatic ring (aromatic epoxy compound); and a compound having at least two epoxy groups in the molecule, at least one of which is formed between two adjacent constituent carbon atoms of an alicyclic ring (alicyclic epoxy compound).

The cationic polymerization-curable adhesive preferably contains a photocationic polymerization initiator. The photocationic polymerization initiator generates a cationic species or a Lewis acid through irradiation with an active energy ray such as visible light, UV light, an X-ray, or an electron beam, to thereby initiate a polymerization reaction of an epoxy group or an oxetanyl group. In addition, the cationic polymerization-curable adhesive may further contain the additive.

E-1. Method of Forming Second Adhesion Layer

The second adhesion layer can be formed by: applying the curable adhesive onto the polarizing film or onto a resin film for forming the transparent protective layer; then bonding the polarizing film and the resin film (transparent protective layer); and then curing the curable adhesive.

The polarizing film or the resin film (transparent protective layer) may be subjected to surface modification treatment before the application of the curable adhesive. Examples of the surface modification treatment include corona treatment, plasma treatment, and saponification treatment.

Any appropriate method may be adopted as a method of applying the curable adhesive, depending on the viscosity of the adhesive and a desired thickness of the second adhesion layer or the like. An example of the application method is application with a reverse coater, a gravure coater (direct, reverse, or offset), a bar reverse coater, a roll coater, a die coater, a bar coater, a rod coater, or the like. In addition, application using a dipping method may be adopted.

Any appropriate method may be adopted as a method of curing the curable adhesive. When the curable adhesive contains a curable compound capable of being cured with an active energy ray, the adhesive may be cured by radiating the active energy ray from the polarizing film side or the transparent protective layer side. From the viewpoint of preventing the deterioration of the polarizing film, it is preferred to radiate the active energy ray from the transparent protective layer side. Conditions such as the wavelength and dose of the active energy ray may be set to any appropriate conditions depending on, for example, the kind of the curable compound to be used. When the curable adhesive contains a curable compound capable of being cured with heat, the adhesive may be cured through heating. Conditions for the heating may be set to any appropriate conditions depending on, for example, the kind of the curable compound to be used. For example, the adhesive may be cured through heating at a temperature of from 60° C. to 200° C. for from 30 seconds to 5 minutes.

F. Optical Laminate

Figure 2:
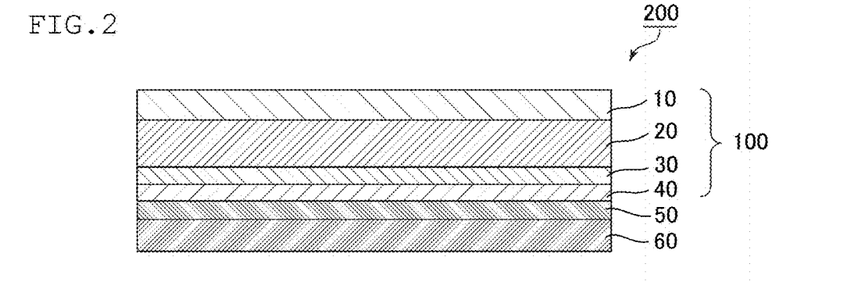
FIG. 2 is a schematic sectional view of an optical laminate according to one embodiment of the present invention.

FIG. 2 is a schematic sectional view of an optical laminate according to one embodiment of the present invention. An optical laminate 200 of FIG. 2 includes the polarizing plate 100, a third adhesion layer 50, and an optical film 60 in the stated order. The polarizing plate described in the sections A to E may be used as the polarizing plate 100. That is, the polarizing plate 100 includes the first adhesion layer 10, the transparent protective layer 20, the second adhesion layer 30, and the polarizing film 40 in the stated order. The third adhesion layer 50 is arranged on the surface of the polarizing film 40 on a side opposite to the second adhesion layer 30. When the optical laminate is constituted by combining the polarizing plate and the optical film, the warping of the polarizing plate is suppressed by the optical film and hence the effects of the present invention become additionally significant. In addition, the deterioration of the polarizing film due to moisture can be suppressed.

The thickness of the optical laminate is preferably 100 μm or less, more preferably 90 μm or less, still more preferably from 20 μm to 80 μm.

G. Optical Film

Any appropriate optical film may be used as the optical film depending on the applications of the optical laminate. Examples of the optical film include a brightness enhancement film, a light diffusion film, and a condensing film. Of those, a brightness enhancement film is preferred.

The thickness of the optical film is preferably from 10 μm to 30 μm, more preferably from 15 μm to 25 μm.

The moisture permeability of the optical film is preferably 100 g/m$^2$/24 hr or less, more preferably 80 g/m$^2$/24 hr or less, still more preferably 50 g/m$^2$/24 hr or less. When the moisture permeability falls within such range, a preventing effect on the deterioration of the polarizing film due to moisture becomes significant.

Figure 3:
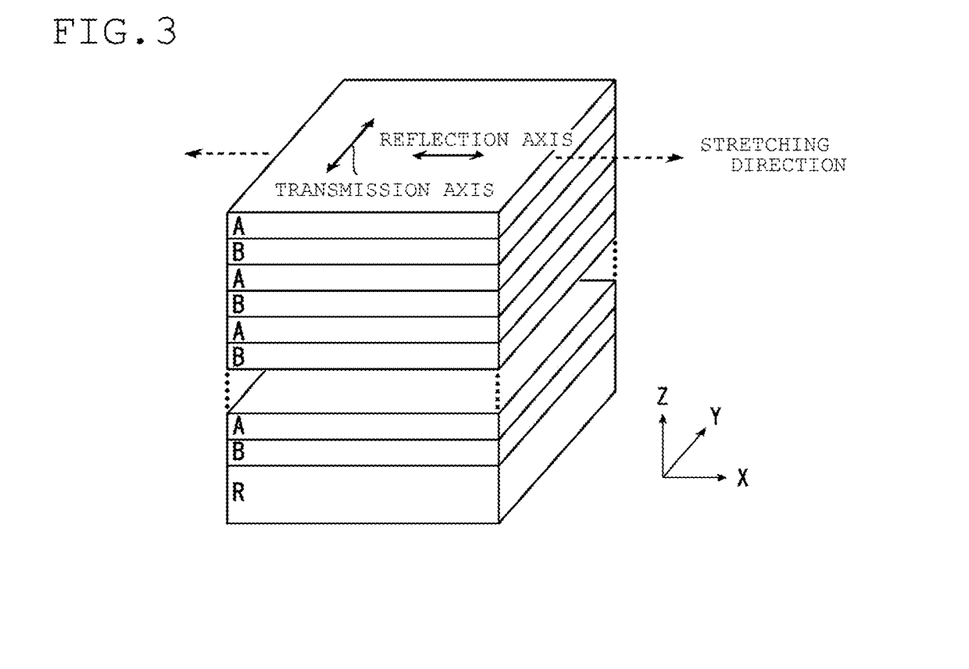
FIG. 3 is a schematic perspective view illustrating an example of a linearly polarized light-separating film to be used in the optical laminate of the present invention.

In one embodiment, a linearly polarized light-separating film is used as the brightness enhancement film. FIG. 3 is a schematic perspective view illustrating an example of the linearly polarized light-separating film. The linearly polarized light-separating film is preferably a multilayer laminate in which a layer A having birefringence and a layer B having substantially no birefringence are alternately laminated. In, for example, the illustrated example, a refractive index n(X) of the layer A in an X-axis direction is larger than a refractive index n(Y) thereof in a Y-axis direction, and the refractive index n(X) of the layer B in the X-axis direction and the refractive index n(Y) thereof in the Y-axis direction are substantially the same. Therefore, a difference in refractive index between the layer A and the layer B is large in the X-axis direction, and is substantially zero in the Y-axis direction. As a result, the X-axis direction serves as a reflection axis and the Y-axis direction serves as a transmission axis. The difference in refractive index between the layer A and the layer B in the X-axis direction is preferably from 0.2 to 0.3.

The layer A is preferably formed of a material that expresses birefringence through stretching. Typical examples of such material include naphthalene dicarboxylic acid polyester (such as polyethylene naphthalate), polycarbonate, and an acrylic resin (such as polymethyl methacrylate). Of those, polyethylene naphthalate or polycarbonate is preferred in terms of low moisture permeability. The layer B is preferably formed of a material that expresses substantially no birefringence even when stretched. Such material is typically, for example, the copolyester of naphthalene dicarboxylic acid and terephthalic acid.

At an interface between the layer A and the layer B, the linearly polarized light-separating film transmits light having a first polarization direction (such as a p-wave), and reflects light having a second polarization direction perpendicular to the first polarization direction (such as an s-wave). At the interface between the layer A and the layer B, part of the reflected light is transmitted as light having the first polarization direction, and the other part thereof is reflected as light having the second polarization direction. Such reflection and transmission are repeated many times in the linearly polarized light-separating film, and hence the utilization efficiency of light can be improved.

The linearly polarized light-separating film preferably includes a reflective layer R as the outermost layer opposite to the polarizing film as illustrated in FIG. 3. Providing the reflective layer R enables additional utilization of light that has finally returned to the outermost portion of the linearly polarized light-separating film without being utilized, and hence can additionally improve the utilization efficiency of light. The reflective layer R typically expresses its reflecting function by virtue of the multilayer structure of a polyester resin layer.

The linearly polarized light-separating film and the polarizing film are preferably laminated so that the transmission axis of the linearly polarized light-separating film and the absorption axis of the polarizing film may be substantially perpendicular to each other. The phrase "substantially perpendicular" as used herein comprehends the case where an angle formed between the two optical axes is 90°±2°, and the angle is preferably 90°±1°.

The entire thickness of the linearly polarized light-separating film may be appropriately set depending on, for example, a purpose and the total number of layers in the linearly polarized light-separating film. The entire thickness of the linearly polarized light-separating film is preferably 30 μm or less, more preferably from 10 μm to 30 μm, still more preferably from 15 μm to 25 μm.

For example, a film described in Japanese Patent Translation Publication No. Hei 9-507308 may be used as the linearly polarized light-separating film.

A commercial product may be used as it is as the linearly polarized light-separating film, or a product obtained by subjecting the commercial product to secondary processing (such as stretching) may be used. Examples of the commercial product include a product available under the trade name "DBEF" from 3M Company and a product available under the trade name "APF" from 3M Company.

H. Third Adhesion Layer

The polarizing film and the optical film are laminated through the third adhesion layer.

In one embodiment, the third adhesion layer may be the same as the adhesion layer (second adhesion layer) described in the section E. That is, an adhesion layer having a bulk water absorption ratio of 10 wt % or less (preferably 8 wt % or less, more preferably 5 wt % or less, still more preferably from 0.05 wt % to 2 wt %) may be formed as the third adhesion layer. When such adhesion layer is formed as the third adhesion layer, a preventing effect on the deterioration of the polarizing film due to moisture becomes significant.

In another embodiment, the third adhesion layer is formed of any appropriate pressure-sensitive adhesive or adhesive. For example, the layer is formed of such pressure-sensitive adhesive or adhesive as described in the section D.

I. Method of Producing Optical Laminate

The optical laminate may be produced by any appropriate production method. A method of producing the optical laminate includes: a step a of forming the polarizing plate; a step b of forming the third adhesion layer on the optical film to provide a laminate I; and a step c of laminating the polarizing plate and the laminate I.

EXAMPLES

The present invention is specifically described below by way of Examples. However, the present invention is not limited to Examples below. It should be noted that measurement methods for respective characteristics are as described below.

<Transmittance and Polarization Degree of Polarizing Film>

A single axis transmittance T, parallel transmittance Tp, and cross transmittance Tc of a polarizing film were measured with a UV-visible spectrophotometer (V7100 manufactured by JASCO Corporation). The T, the Tp, and the Tc are each a Y value obtained by subjecting a value measured with the two-degree field of view (C light source) of JIS Z 8701 to relative spectral responsivity correction. The measurement was performed in a state where a transparent protective layer (acrylic resin film) was bonded to the polarizing film in order for the handling of the polarizing film to be facilitated. The transmittance of the resultant laminate was defined as the transmittance of the polarizing film because the light absorption of the transparent protective layer was negligibly small as compared with the light absorption of the polarizing film.

A polarization degree P was determined from the following equation by using the transmittances.

Polarization degree $P$ (%)=$\{(Tp-Tc)/(Tp+Tc)\}^{1/2} \times 100$

<Boric Acid Content of Polarizing Film>

The polarizing film was dried under heat (at 120° C. for 2 hours), and was then pulverized to provide an evaluation sample having a weight of 1 g. 1 Gram of the evaluation sample was completely dissolved in 500 ml of water at 95° C. 10 Grams of mannitol and 2 ml of a bromothymol blue solution (BTB solution) were added to the resultant aqueous solution to prepareasample solution. A 0.1 mol/l aqueous solution of sodium hydroxide was dropped to the sample solution until a neutral point was reached, and the boric acid content (wt %) was calculated from the dropping amount on the basis of the following equation.

(Dropping amount (mL) of aqueous solution of NaOH×concentration (mol/L) of aqueous solution of NaOH×$10^{-3}$/weight (g) of polarizer)× molecular weight (g/mol) of boric acid×100

<Thickness>

The thicknesses of the polarizing film and respective layers were each measured using a digital micrometer (manufactured by ANRITSU CORPORATION, trade name: "KC-351C").

<Moisture Permeability>

Measurement was performed on the basis of the moisture permeability test method for moisture-proof packaging materials (cup method) described in JIS Z 0208.

<Bulk Water Absorption Ratio>

A curable adhesive used in the formation of the second adhesion layer was cured under the same conditions as those of Examples to produce a cured product for evaluation having a thickness of 100 μm (weight: M1 g). The cured product for evaluation was immersed in pure water at 23° C. for 24 hours and was then taken out, and water on its surface was wiped off. After that, the weight (M2 g) of the cured product for evaluation after the immersion was measured. A bulk water absorption ratio was calculated from the weight M1 g of the cured product for evaluation before the immersion and the weight M2 g of the cured product for evaluation after the immersion in accordance with the expression $\{(M2-M1)/M1\} \times 100(\%)$.

Production Example 1-1

Production of Polarizing Film A (Boric Acid Content: 16 wt %)

An amorphous polyethylene terephthalate (A-PET) film (manufactured by Mitsubishi Plastics, Inc., trade name: "NOVACLEAR SH046", thickness: 200 μm) was prepared as a resin base material, and the surface of the resin base material was subjected to corona treatment (58 W/m²/min). Meanwhile, PVA (polymerization degree: 4,200, saponification degree: 99.2%) having added thereto 1 wt % of acetoacetyl-modified PVA (manufactured by The Nippon Synthetic Chemical Industry Co., Ltd., trade name: "GOHSEFIMER Z200", polymerization degree: 1,200, saponification degree: 99.0% or more, acetoacetyl modification degree: 4.6%) was applied onto the resin base material so that its thickness after drying became 12 μm, and the applied PVA was dried under an atmosphere at 60° C. by hot-air drying for 10 minutes. Thus, a laminate in which a PVA-based resin layer was provided on the resin base material was produced.

First, the laminate was stretched at a ratio of 2.0 times in air at 130° C. to produce a stretched laminate.

Next, the PVA layer, in which PVA molecules were aligned, in the stretched laminate was insolubilized by immersing the stretched laminate in an insolubilizing aqueous solution of boric acid having a liquid temperature of 30° C. for 30 seconds. The boric acid content of the insolubilizing aqueous solution of boric acid in this step was set to 3 parts by weight with respect to 100 parts by weight of water.

Next, the stretched laminate was immersed in a dyeing liquid (liquid temperature: 30° C.) to provide such a colored laminate that iodine had been caused to adsorb to the PVA layer. The dyeing liquid contained iodine and potassium iodide, and was adjusted so that the single axis transmittance of the PVA layer constituting the polarizing film to be finally obtained became 42.5%. The dyeing liquid used water as a solvent, its iodine concentration was set within the range of from 0.08 to 0.25 wt %, and its potassium iodide concentration was set within the range of from 0.56 to 1.75 wt %.

Next, the step of immersing the colored laminate in a crosslinking aqueous solution of boric acid at 40° C. for 60 seconds to subject the PVA molecules of the PVA layer to which iodine had been caused to adsorb to crosslinking treatment was performed. The boric acid content of the crosslinking aqueous solution of boric acid in this step was set to 5 parts by weight with respect to 100 parts by weight of water, and the potassium iodide content thereof was set to 3.0 parts by weight with respect to 100 parts by weight of water.

Further, the resultant colored laminate was stretched in the same direction as that of the stretching in air at a ratio of 2.7 times in an aqueous solution of boric acid at a stretching temperature of 70° C. (underwater stretching step). The boric acid content of the aqueous solution of boric acid in this step was set to 3.5 parts by weight with respect to 100 parts by weight of water, and the potassium iodide content thereof was set to 5.0 parts by weight with respect to 100 parts by weight of water.

The laminate after the stretching was removed from the aqueous solution of boric acid, boric acid adhering to the surface of the PVA layer was washed off with an aqueous solution having a potassium iodide content of 4.0 parts by weight with respect to 100 parts by weight of water, and the laminate was dried by a drying step with warm air at 60° C. Thus, a polarizing film A (boric acid content: 16 wt %) having a thickness of 5 μm laminated on the A-PET film was obtained.

Production Example 1-2

Production of Polarizing Film B (Boric Acid Content: 18 wt %)

A polarizing film B (boric acid content: 18 wt %) was obtained in the same manner as in Production Example 1-1 except that the boric acid content in the aqueous solution of boric acid used in the underwater stretching step was set to 4 parts by weight with respect to 100 parts by weight of water.

Production Example 1-3

Production of Polarizing Film C (Boric Acid Content: 20 wt %)

A polarizing film C (boric acid content: 20 wt %) was obtained in the same manner as in Production Example 1-1 except that the boric acid content in the aqueous solution of boric acid used in the underwater stretching step was set to 4.5 parts by weight with respect to 100 parts by weight of water.

Production Example 2

Production of Resin Film for Forming Protective Layer

A methacrylic resin pellet having a glutarimide ring unit was dried at 100.5 kPa and 100° C. for 12 hours, and the dried product was extruded with a uniaxial extruder at a die temperature of 270° C. from a T-die to be formed into a film shape. Further, the film was stretched in its conveying direction under an atmosphere having a temperature higher than the Tg of the resin by 10° C., and was then stretched in a direction perpendicular to the film-conveying direction under an atmosphere having a temperature higher than the Tg of the resin by 7° C. to provide a resin film for forming a protective layer formed of an acrylic resin.

It should be noted that a resin film I for forming a protective layer having a thickness of 20 μm (moisture permeability: 160 g/m$^2$/24 hr) and a resin film II for forming a protective layer having a thickness of 30 μm (moisture permeability: 120 g/m$^2$/24 hr) were each formed as the film.

Production Example 3

Production of Curable Adhesive

Respective components were mixed as shown in Table 1 and stirred at 50° C. for 1 hour to obtain a curable adhesive A and a curable adhesive B each capable of being cured with an active energy ray. It should be noted that when the curable adhesives were each cured under the same conditions as those of Example 1 to be described later and measured for its bulk water absorption ratio, the curable adhesive A had a bulk water absorption ratio of 1.3 wt % and the curable adhesive B had a bulk water absorption ratio of 68.2 wt %.

TABLE 1

| | | | Curable adhesive A | Curable adhesive B |
|---|---|---|---|---|
| Radically polymerizable compound | Monofunctional | HEAA | 10 parts by weight | 35 parts by weight |
| | | ACMO | — | 40 parts by weight |
| | | FA-THFM | 10 parts by weight | 0 parts by weight |
| | Polyfunctional | LIGHT ACRYLATE DCP-A | 80 parts by weight | 0 parts by weight |
| | | TPGDA | — | 25 parts by weight |
| Radical polymerization initiator | | IRGACURE 907 | 3 parts by weight | 3 parts by weight |
| | | KAYACURE DETX-S | 3 parts by weight | 3 parts by weight |

The radically polymerizable compounds in Table 1 are as follows:

HEAA: hydroxymethylacrylamide, log P=−0.56, Tg of its homopolymer=123° C., manufactured by KOHJIN Holdings Co., Ltd;

ACMO: acryloylmorpholine, log P=−0.20, Tg of its homopolymer=150° C., manufactured by KOHJIN Holdings Co., Ltd;

FA-THFM: tetrahydrofurfuryl(meth)acrylate, log P=1.13, Tg of its homopolymer=45° C., manufactured by Hitachi Chemical Co., Ltd;

LIGHT ACRYLATE DCP-A: tricyclodecanedimethanol diacrylate, log P=3.05, Tg of its homopolymer=134° C., manufactured by KYOEISHA CHEMICAL Co., LTD; and TPGDA: tripropylene glycol diacrylate, log P=1.68, Tg of its homopolymer=69° C., manufactured by TOAGOSEI CO., LTD. (ARONIXM-220).

The radical polymerization initiators are as follows:

IRGACURE 907 (2-methyl-1-(4-methylthiophenyl)-2-morpholinopropan-1-one), log P=2.09, manufactured by BASF; and KAYACURE DETX-S (diethylthioxanthone), log P=5.12, manufactured by Nippon Kayaku Co., Ltd.

Example 1

The resin film II for forming a protective layer having a thickness of 30 μm (Production Example 2) was bonded to the surface of the polarizing film A having a thickness of 5 μm laminated on the A-PET film (Production Example 1-1) on a side opposite to the A-PET through the curable adhesive A (Production Example 3). Specifically, the curable adhesive A was applied onto the resin film II for forming a protective layer with an MCD coater (manufactured by FUJI MACHINERY CO., LTD., cell shape: honeycomb, number of gravure roll lines: 1,000 lines/inch, rotation speed: 140% with respect to a line speed) so that its thickness became 0.7 μm, and the resin film was bonded by using a roller machine. The bonding was performed at a line speed of 25 m/min. After that, the resultant was warmed to 50° C. with an IR heater from a side closer to the resin film II for forming a protective layer, and the curable adhesive A was cured by irradiating the side closer to the resin film II for forming a protective layer with the visible light. After that, the resultant was dried with hot air at 70° C. for 3 minutes to provide a laminate having a transparent protective layer on one side of the polarizing film laminated on the A-PET film. It should be noted that a gallium-sealed metal halide lamp (manufactured by Fusion UV Systems, Inc., trade name: "Light HAMMER 10", bulb: V bulb) was used as an irradiation apparatus in the irradiation with the visible light, and the irradiation was performed under the conditions of a peak illuminance of 1,600 mW/cm$^2$ and a cumulative irradiation dose of 1,000 mJ/cm$^2$ (wavelength: 380 to 440 nm). It should be noted that the illuminance of the visible light was measured with a Sola-Check System manufactured by Solatell. Further, the A-PET film was peeled from the laminate. Thus, a polarizing plate formed of the polarizing film A, the second adhesion layer, and the transparent protective layer was obtained.

Next, an acrylic adhesion layer having a thickness of 20 μm (first adhesion layer) was formed on the transparent protective layer surface of the laminate (polarizing film A/second adhesion layer/transparent protective layer), and a release film manufactured by TORAY ADVANCED FILM Co., Ltd. (trade name: Cerapeel, thickness: 38 μm) was bonded through the first adhesion layer. Further, a brightness enhancement film manufactured by Sumitomo 3M Limited (trade name: APF, thickness: 20 μm) was bonded to the polarizing film surface of the laminate (polarizing film A/second adhesion layer/transparent protective layer/first adhesion layer) through an acrylic adhesion layer having a thickness of 5 µm (third adhesion layer). Thus, an optical laminate (boric acid content of polarizing film: 16 wt %) was produced.

Example 2

An optical laminate was produced in the same manner as in Example 1 except that the resin film I for forming a protective layer (thickness: 20 µm, moisture permeability: 160 g/m²/24 hr) was used instead of the resin film II for forming a protective layer.

Example 3

An optical laminate was produced in the same manner as in Example 1 except that a cycloolefin-based protective film (manufactured by Zeon Corporation, thickness: 13 µm, moisture permeability: 12 g/m²/24 hr) was used instead of the resin film II for forming a protective layer.

Example 4

An optical laminate was obtained in the same manner as in Example 1 except that the polarizing film B was used instead of the polarizing film A and the thickness of the third adhesion layer was set to 12 µm.

Comparative Example 1

An optical laminate was obtained in the same manner as in Example 1 except that the curable adhesive B was used instead of the curable adhesive A.

Comparative Example 2

An optical laminate was obtained in the same manner as in Example 1 except that a triacetylcellulose-based film (thickness: 25 µm, moisture permeability: 2,000 g/m²/24 hr) was used instead of the resin film I for forming a protective layer.

Comparative Example 3

An optical laminate was obtained in the same manner as in Example 1 except that the polarizing film C was used instead of the polarizing film A.

<Evaluation 1>
Durability Evaluation

Each of the optical laminates produced in Examples and Comparative Examples was subjected to a warming and humidification test, and was evaluated for its durability on the basis of its external appearance after the test.

Specifically, an evaluation sample was produced by bonding the optical laminate having a size of 150=×200 mm to a glass. The evaluation sample was left to stand in a warming and humidifying oven having a temperature of 65° C. and a humidity of 90% for 500 hours. The evaluation sample was removed from the oven, and 12 hours after that, the evaluation sample and a polarizing plate (SEG-type polarizing plate manufactured by Nitto Denko Corporation) were arranged in a crossed Nicols state on a backlight having a brightness of 10,000 cd/cm², and whether or not an external appearance failure such as a spot occurred in the evaluation sample was confirmed.

As a result, in each of Examples 1 to 4, an external appearance failure such as a spot was not observed, and hence the optical laminates and polarizing plates produced in the examples were each excellent in durability. On the other hand, in each of Comparative Examples 1 and 2, a streak-like spot pattern (unevenness) was observed, and hence the optical laminates and polarizing plates produced in the comparative examples were each poor in durability.

Figure 4A:
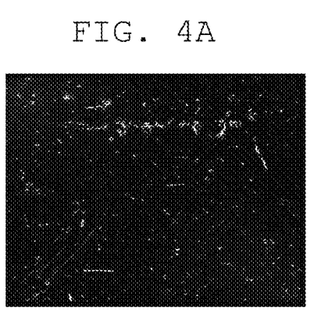
FIG. 4A is an external appearance photograph in the durability evaluation of Example 1 and FIG. 4B is an external appearance photograph in the durability evaluation of Comparative Example 1.
Figure 4B:
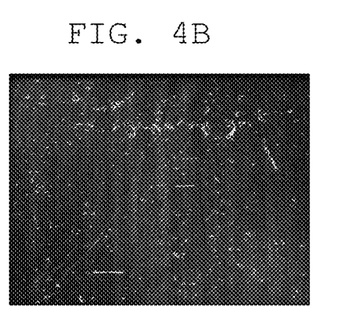

Table 2 shows the outlines of Examples and Comparative Examples, and the results of the evaluation. In addition, FIG. 4A shows an external appearance photograph in the evaluation of Example 1 and FIG. 4B shows an external appearance photograph in the evaluation of Comparative Example 1.

<Evaluation 2>
Warping Evaluation

An evaluation sample was produced in the same manner as in the durability evaluation, and the evaluation sample was left to stand in a warming and humidifying oven having a temperature of 65° C. and a humidity of 90% for 500 hours. In each of Examples 1 to 4, and Comparative Examples 1 and 2, warping causing a problem in practical use was not observed. On the other hand, in Comparative Example 3, i.e., in the case where the boric acid content of the polarizing film was excessively large, remarkable warping was observed.

TABLE 2

| | Polarizing film | | | Second adhesion layer | | Transparent protective layer | | | | |
| --- | --- | --- | --- | --- | --- | --- | --- | --- | --- | --- |
| | Kind | Boric acid content (wt %) | Thickness (µm) | Adhesive | Bulk water absorption ratio (%) | Kind | Thickness (µm) | Moisture permeability (g/m²/24 hr) | Durability evaluation | Warping |
| Example 1 | Polarizing film A | 16 | 5 | Curable adhesive A | 1.3 | Resin film II for forming protective layer | 30 | 120 | ○ | ○ |
| Example 2 | Polarizing film A | 16 | 5 | Curable adhesive A | 1.3 | Resin film I for forming protective layer | 20 | 160 | ○ | ○ |
| Example 3 | Polarizing film A | 16 | 5 | Curable adhesive A | 1.3 | Cycloolefin-based protective film | 13 | 12 | ○ | ○ |
| Example 4 | Polarizing film B | 18 | 5 | Curable adhesive A | 1.3 | Resin film II for forming protective layer | 30 | 120 | ○ | ○ |
| Comparative Example 1 | Polarizing film A | 16 | 5 | Curable adhesive B | 68.2 | Resin film II for forming protective layer | 30 | 120 | x | ○ |

TABLE 2-continued

| | Polarizing film | | | Second adhesion layer | | Transparent protective layer | | | | |
|---|---|---|---|---|---|---|---|---|---|---|
| | Kind | Boric acid content (wt %) | Thickness (μm) | Adhesive | Bulk water absorption ratio (%) | Kind | Thickness (μm) | Moisture permeability (g/m²/24 hr) | Durability evaluation | Warping |
| Comparative Example 2 | Polarizing film A | 16 | 5 | Curable adhesive A | 1.3 | Triacetyl-cellulose-based film | 30 | 2,000 | x | o |
| Comparative Example 3 | Polarizing film C | 20 | 5 | Curable adhesive A | 1.3 | Resin film II for forming protective layer | 30 | 120 | o | x |

The polarizing plate of the present invention is suitably used for liquid crystal televisions, liquid crystal displays, mobile phones, liquid crystal panels of, for example, digital cameras, video cameras, portable game machines, car navigation systems, copying machines, printers, facsimile machines, timepieces, and microwave ovens, and anti-reflection plates of organic EL devices.

What is claimed is:

1. A polarizing plate, comprising a first adhesion layer, a transparent protective layer, a second adhesion layer, and a polarizing film in the stated order, wherein:
    the first adhesion layer has a thickness of 10 μm or more;
    the transparent protective layer has a thickness of 30 μm or less;
    the transparent protective layer has a moisture permeability of 200 g/m²/24 hr or less;
    the second adhesion layer has a bulk water absorption ratio of 10 wt % or less;
    the polarizing film has a thickness of 10 μm or less; and
    the polarizing film has a boric acid content of 18 wt % or less with respect to a weight of the polarizing film,
    wherein a storage modulus of the second adhesion layer at a temperature of 70° C. or less is at least $1.0 \times 10^6$ Pa.

2. An optical laminate, comprising the polarizing plate of claim 1, a third adhesion layer, and an optical film in the stated order, wherein the third adhesion layer is provided on a side of the polarizing film of the polarizing plate opposite to the second adhesion layer.

3. The optical laminate according to claim 2, wherein the optical film comprises a brightness enhancement film.

* * * * *